Figure 3:
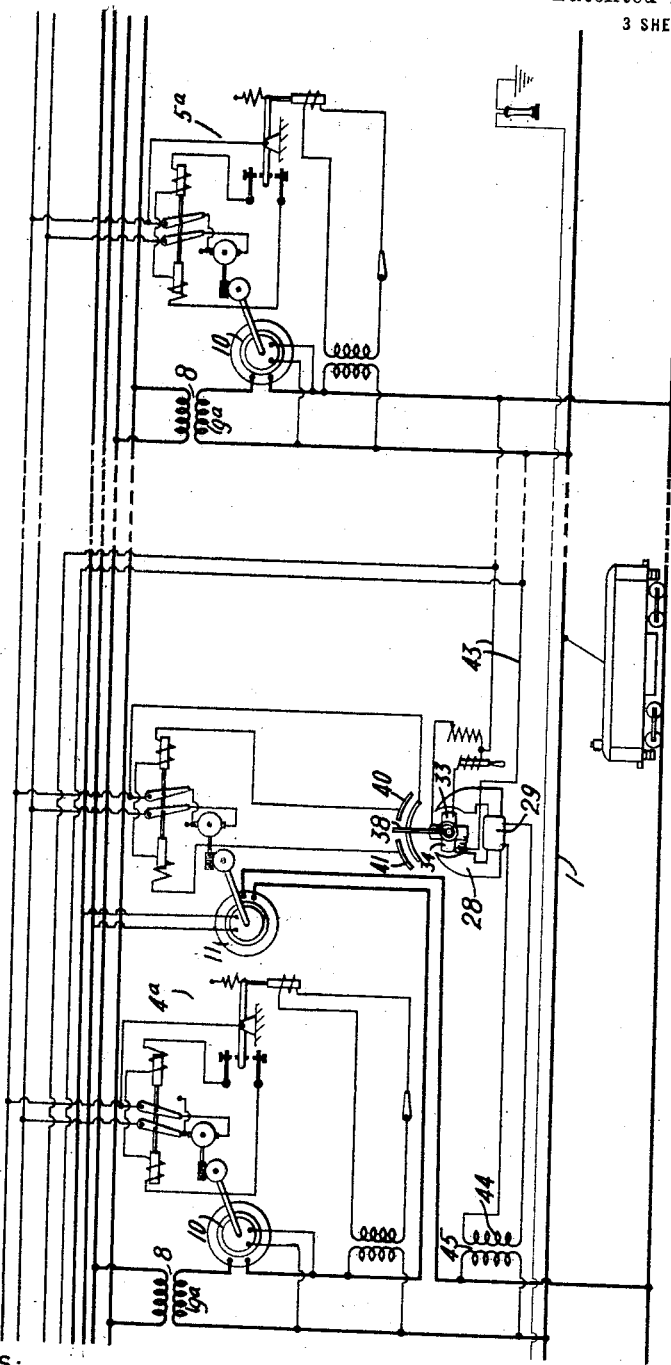

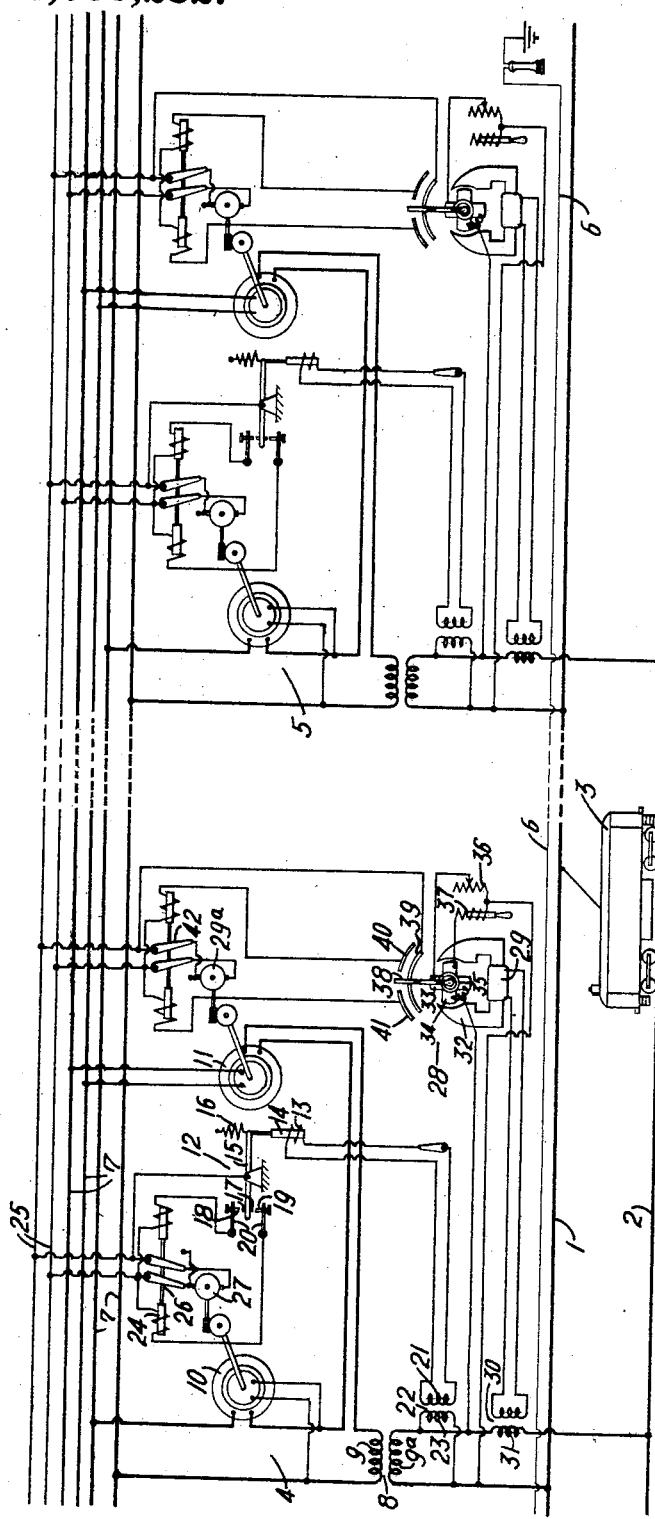

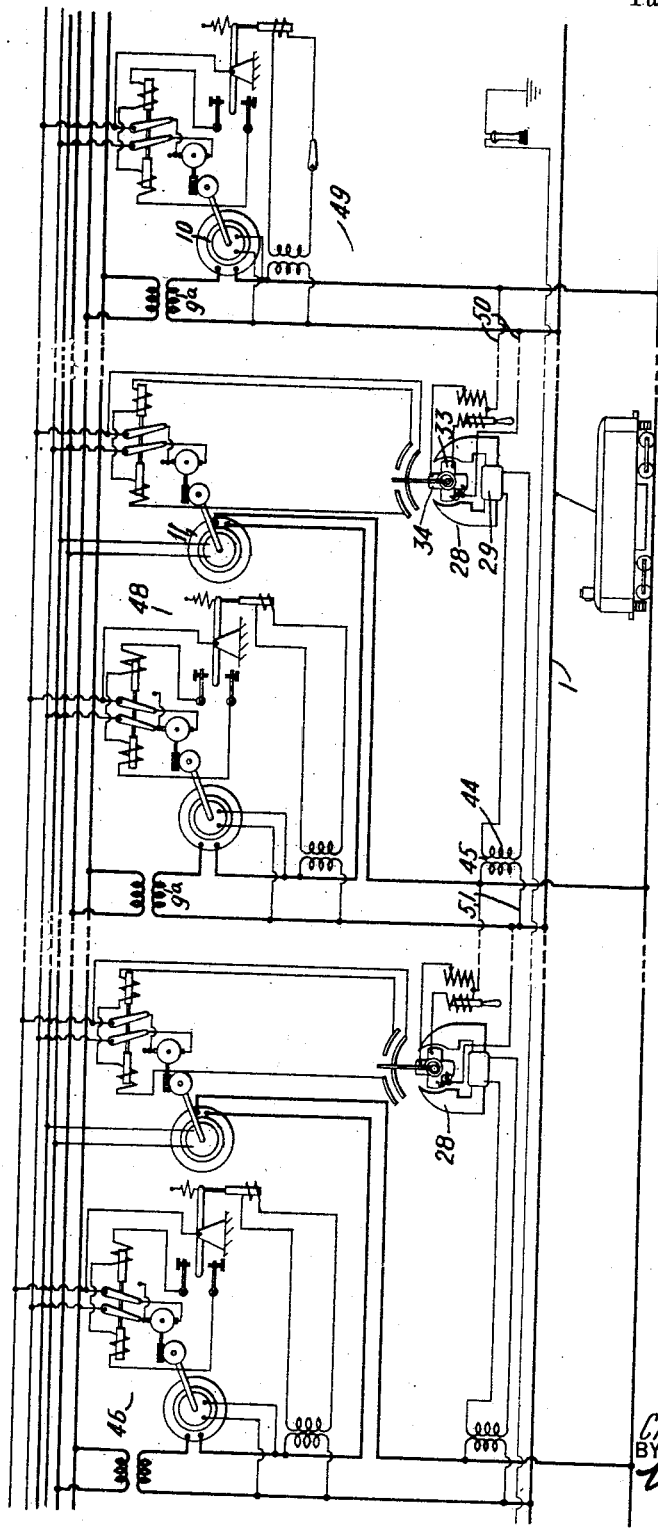

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

DISTRIBUTING SYSTEM FOR MINIMIZING INDUCTIVE INTERFERENCES.

1,303,282.      Specification of Letters Patent.     Patented May 13, 1919.

Application filed August 9, 1915. Serial No. 44,427.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Distributing Systems for Minimizing Inductive Interferences, of which the following is a specification.

My invention relates to electrical distributing systems, and it has special reference to systems comprising a common power circuit which is supplied with electrical energy from a plurality of spaced sub-stations.

More particularly, my invention refers to an alternating-current railway system, the trolley circuit of which is furnished with electrical energy from a plurality of spaced sub-stations and is paralleled, for longer or shorter distances by an intelligence-transmission circuit, such as a telephone or a telegraph circuit. Moreover, my invention refers to a system of the above-mentioned character which embodies means for minimizing the inductive disturbances impressed upon the aforementioned adjacently disposed intelligence-transmission circuit as a result of the flow of the trolley currents in the railway circuit.

When telephone, telegraph and like circuits are in proximity to other circuits carrying alternating currents for lighting or power purposes, such as alternating-current railway systems, the electromotive forces induced in the intelligence-transmission circuits disturb and frequently preclude their successful operation. For example, consider an alternating-current railway system in which a trolley wire constitutes one of the supply conductors and the track rails, in conjunction with the ground, constitute the other supply conductor. When a moving vehicle receives power from the system, a primary circuit comprising a single convolution of varying length and constituting the trolley conductor and the track rails, is formed, and the currents flowing therein induce alternating electromotive forces in the telephone or telegraph circuits that are located partially or wholly in proximity to the railway system. In the usual installations of this character, the electromotive forces induced in an intelligence-transmission circuit depend upon the distance it is removed from the railway circuit, the amounts and rates of variation of the currents flowing in the railway system, and the length of the intelligence-transmission circuit which is in the zones of disturbing influences.

In railway systems embodying two or more spaced sub-stations for furnishing electrical energy to a common trolley conductor, the aforementioned causes of disturbances are somewhat modified as a result of the currents flowing in opposite directions from the sub-stations on both sides of an intermediate load point which, in this instance, constitutes a moving vehicle such as a trolley car or an electric locomotive. Under these circumstances, it is essential for the satisfactory operation of an adjacent intelligence-transmission circuit that the electromotive forces induced therein on both sides of the moving load point be substantially equal in value and directly opposed in order to effectively neutralize each other.

In systems heretofore installed, this result has not been attained because of the variations in the voltages impressed on the common trolley conductor at the separate sub-stations as the moving load changes its position relative thereto. For example, when a moving vehicle, intermediate two sub-stations and demanding power from the trolley circuit, advances toward one sub-station and away from the other, the voltage impressed on the trolley conductor by the closely-adjacent sub-station decreases below normal value, and the voltage impressed thereupon by the more remote sub-station increases above normal value. This is a result of the unequal demands for power from the several sub-stations. In consequence thereof, the oppositely directed currents flowing in the respective paths of the trolley circuit to the moving load point are not in substantially exact inverse proportion to the distances of the moving load point from the several sub-stations and, moreover, these oppositely directed currents may be displaced in phase relationship with respect to each other to such a degree as to seriously impair the operation of the adjacent telephone or telegraph circuit.

Since the electromotive forces induced in an adjacently-disposed intelligence-transmission circuit are effectively neutralized only when the ampere-miles on both sides of the moving load point are substantially equal in value and the electromotive forces induced in the intelligence-transmission circuit are substantially opposite in phase relationship, it will be apparent that inductive disturbances will not be substantially eliminated until means are embodied in the power or railway system for maintaining the voltages impressed upon the common trolley conductor by the separate sub-stations substantially equal in value and constant, irrespective of the load conditions obtaining on the railway system. Again, the oppositely-directed electromotive forces induced in the adjacently disposed intelligence-transmission circuit will be neutralized only when they are substantially opposed in phase relationship.

My invention is designed for the accomplishment of these objects and other objects to be hereinafter disclosed.

Figure 1 is a diagrammatic representation of an electrical railway system embodying a form of my invention; Fig. 2 is a vectorial diagram to illustrate the mode of operation of my railway system, and Figs. 3 and 4 are diagrams illustrating modifications of the system shown in Fig. 1.

Referring to Fig. 1, a railway or trolley circuit, constituting a trolley conductor 1 and a track 2, furnishes power to a movable load or a moving vehicle 3 which is shown as being positioned on the trolley circuit at a point intermediate sub-stations 4 and 5. An intelligence-transmission conductor 6, shown as a telephone conductor, is disposed adjacent to the trolley conductor 1 and the track 3 and is, therefore, under the inductive influences arising from the load currents flowing over the railway circuit. For the purpose of illustration only, the telephone conductor 6 may be considered as being equally spaced from the trolley conductor 1 throughout the length of the railway circuit. It will be understood, however, that my invention is effective in minimizing the inductive disturbances impressed upon the telephone conductor 6 whether or not it is spaced uniformly from the trolley conductor 1 throughout its entire length.

It is to be presumed that the sub-stations 4 and 5 are spaced considerable distances from each other, such distances being dependent upon the particular features obtaining in, and the character of the railway system. Again, the sub-stations 4 and 5 are representative only of the many sub-stations that may furnish power to the railway circuit, each sub-station being a substantial duplicate, as far as the electrical equipment is concerned, of the other sub-stations. Therefore, I will describe my invention as applied to one sub-station only, it being understood that the operation of the electrical equipment in the remaining sub-stations is similar.

One phase of a polyphase high-tension transmission line, shown as a two-phase system, comprising conductors 7, furnishes power to all of the sub-stations, such as 4 and 5, which, in turn, transform the power to suitable voltages for the operation of the railway circuit. At each sub-station, a transformer 8 is installed comprising a high-tension winding 9 which is connected to one phase of the transmission line 7, and a low-tension winding $9^a$, one terminal of which is connected to the trolley conductor 1 and the other terminal of which is grounded or connected to the track conductor 2. In series circuit with each of the high-tension windings 9 of the transformer 8 are inserted secondary windings (not shown) of induction regulators 10 and 11, the operation of each being independently controlled by conditions obtaining in the railway circuit.

It will be appreciated that the inductive disturbances impressed upon the telephone conductor 6 must be substantially neutralized in order to permit satisfactory operation of the telephone circuit and, to this end, the electromotive forces induced in the telephone conductor 6 by reason of the load currents flowing from the sub-stations 4 and 5 to the intermediate moving vehicle 3 must be substantially neutralized. Since the electromotive forces induced in the telephone conductor 6 are proportional to the ampere-miles on each side of the point of load application of the moving vehicle 3, it is necessary that the load currents traversing the trolley conductor 1 in opposite directions to the moving vehicle 3, be inversely proportional to the length of the circuits intervening between the sub-stations and the point of load application. To accomplish this, it is necessary that the voltages impressed upon the railway circuit by the sub-stations 4 and 5 be maintained constant and equal in value, irrespective of the position of the moving vehicle 3 and the demands for power required thereby. To this end, each sub-station is equipped with the induction regulator 10, the operation of which is controlled by a contact volt-meter 12 which, in turn, responds to the voltages impressed by the secondary winding $9^a$ upon the railway circuit. The induction regulator 10 is of the usual type of construction comprising relatively movable windings, the induction between which is varied by their relative positions. The primary winding of the regulator 10 is connected in shunt to one phase of the transmission line 7.

Consider, for example, that the moving vehicle 3 is in close proximity to the sub-station 4. In this event, the current supplied to the moving vehicle 3 from the substation 4 will be in excess of that supplied from the sub-station 5. The tendency, therefore, is to effect a decrease in the value of the voltage impressed on the trolley circuit by the sub-station 4 because of the abnormal supply of current demanded therefrom. However, the contact voltmeter 12 responds to this tendency to decrease the voltage impressed on the railway circuit and operates the induction regulator 10 to maintain the voltage at a constant value.

The contact voltmeter 12 comprises an electromagnet 13 having a movable core 14 which is linked, at its upper end, to a pivoted arm 15. A spring 16 is so designed as to aid in balancing the weight of the core member 14 when the desired normal voltage obtains upon the secondary winding 9$^a$. Contact points 17 are provided at the other end of the pivoted arm 16 which, in their movements, touch one or the other of adjustable contact points 18 and 19 that are flexibly supported by springs 20. The winding of the electromagnet 13 is connected to a secondary winding 21 of a voltage transformer 22 the primary winding 23 of which is connected across the secondary winding 9$^a$ of the transformer 8. When an abnormal current is demanded of the sub-station 4, the voltage impressed upon the winding of the electromagnet 13 momentarily decreases, thereby permitting the pivoted arm 15 to effect engagement between one of the contact points 17 and the contact point 19. As a result, current flows through a solenoid 24 which is connected in circuit with direct-current supply mains 25. When the solenoid 24 is energized, a reversing switch 26 is moved to the position shown at the sub-station 4, thereby closing a circuit through a motor 27 which is likewise furnished with power from the mains 25. The motor 27, thus being actuated, in turn moves the primary element of the induction regulator 10 to the required position for maintaining the voltage impressed by the sub-station 4 upon the railway circuit substantially constant. It will be understood that the movement of the pivoted arm 15 in one direction or the other causes the appropriate circuit connections to be completed in order to operate the reversing switch 20 in the desired direction.

While I have described means for maintaining the voltages impressed by the several sub-stations upon the railway circuit constant, irrespective of the position of the moving vehicle 3 or the demands for power required thereby, it will be understood that the oppositely directed currents flowing to the moving vehicle 3 must be substantially directly opposed in phase relationship in order to effectively neutralize the electromotive forces induced in the adjacently-disposed telephone conductor 6. To this end, I have supplied each of the sub-stations with the voltage regulators 11, the operation of which is dependent upon the power factors of the load currents supplied by the sub-stations. The primary winding (not shown) of the regulator 11 is connected in shunt to the other phase of the two-phase transmission system 7. The electromotive forces induced in the secondary winding of the regulator, therefore, are displaced ninety degrees from those induced in the secondary winding of the regulator 10. A power-factor relay 28 controls the direction of movement of a motor 29$^a$ which, in turn, actuates the movable element of the regulator 11.

The power-factor relay 28 comprises a winding 29 which is supplied with current from a series transformer 30, a primary winding 31 thereof being connected in series circuit with the secondary winding 9$^a$ of the transformer 8. The coil 29 is disposed upon a core 32 of magnetizable material. Fine wire coils 33 and 34, mounted upon a common rotatable axis within the field created by the winding 29 and the core member 32, are subject to the restraining influence offered by a tensional element or spiral spring 35. The two coils 33 and 34 are connected in different branches of a path shunted across the secondary winding 9$^a$ of the transformer 8. A non-inductive resistance element 36 and an inductive element 37 are connected, respectively, to the coils 33 and 34 in order to obtain an operative quadrature phase relationship between the currents flowing therein. A contact-making device or pointer 38 mounted upon the common axis with the coils 33 and 34 operates to connect a conducting segment 39 either to a conducting segment 40 or a conducting segment 41, depending upon whether the power factor of the load current supplied by the transformer 8 is positive or negative. When the contact member 38 engages the one or the other of the contact segments 40 and 41, a reversing switch 42 will be actuated, as hereinbefore explained with reference to the reversing switch 26, to permit the motor 29 to move the movable element of the regulator 11 to the proper position.

Referring to the operation of the power-factor relay 28, the coil 29 is traversed by a current the phase of which always bears a definite relation to the phase of the current supplied to the trolley conductor 1. The coils 33 and 34 are traversed by currents having displaced phases but which also bear a definite phase relation to the voltage impressed upon the trolley conductor 1. As a result, the movable system comprising the coils 33 and 34 will take up a position dependent upon the phase difference between the voltage impressed upon, and the current supplied to, the trolley conductor 1 by the sub-station 4. It will be understood that the operation of the power-factor relays in the other sub-stations connected to the railway system will be similar to that explained above and independent of the conditions obtaining in any of the other sub-stations.

By the conjoint action of the contact-making voltmeter 12 and the power-factor relay 28, the regulators 10 and 11 will be respectively operated in accordance with the predetermined values selected, respectively, for the voltage impressed upon the railway circuit and the power factor of the currents to be supplied thereto. In consequence thereof, the electromotive forces induced in the adjacently-disposed telephone conductor 6 will be substantially neutralized, inasmuch as the ampere-miles on both sides of the moving vehicle 3 will be substantially equal in value, and the oppositely-directed currents flowing thereto over the trolley conductor 1 will be substantially directly opposed in phase relationship to each other. Each of the sub-stations 4 and 5 are thus independently equipped to maintain a constant voltage upon the trolley conductor 1 and to supply load currents thereto of constant power factor.

To understand more fully the operation of my system, reference may be had to Fig. 2 in which a vector OA may represent, in length and position, the value and phase relationship of the voltage it is desired for each sub-station to maintain upon the trolley conductor 1. Assume that a vector OB represents, in value and phase relationship, the voltage which may be momentarily impressed by a sub-station or power unit upon the railway circuit by reason of abnormal conditions obtaining therein. In order that the voltage vector OB may coincide with the required voltage vector OA, a voltage vector BA is vectorically added thereto. The vector BA, in turn, comprises two components BC and CA, the vector BC being dependent upon the power factor or phase displacement of the vector OB and the vector AC being dependent upon the excess value of the voltage represented by the vector OB. The voltage component, represented by the vector CA, which is proportional to the excess arithmetical value of the voltage vector OB, is furnished by the secondary winding of the induction regulator 10, and the voltage component, represented by the vector BC, which is proportional to the phase displacement of the vector OB, is furnished by the secondary winding of the voltage regulator 11. Since the regulators 10 and 11 operate simultaneously, the vector OB is so modified as to coincide in phase and value with the vector OA. The same reasoning may be applied to a vector OD which is substantially smaller in length than the vector OA and is displaced in phase relationship therefrom. When this circumstance obtains, however, the voltage regulators 10 and 11 will operate in a direction reverse to that hereinbefore explained and impress component voltages represented by the vectors DE and EA, respectively, which, in turn, will operate to lengthen the vector OD to equal that of the vector OA and also to coincide in phase relationship therewith.

While the above description refers to a railway system in which the intelligence-transmission conductor 6 is equally spaced from the portion illustrated of the trolley conductor 1, it will be understood that, by regulating the operation of the contact voltmeters 12 and the power-factor relays 28, the inductive disturbances impressed upon the telephone conductor 6 may be substantially neutralized even though it is not uniformly spaced from the trolley conductor 1. Again, it may be unnecessary to maintain unity power factor upon the railway system 1, inasmuch as small variations in phase relationship between the oppositely-directed load currents may impose only inconsequential disturbances upon the telephone conductor 6.

While the system of Fig. 1 shows independent means for controlling the value and the power factor of the voltages impressed upon the trolley conductor 1 by the several sub-stations, it is conceivable that the sub-stations may be interconnected by means of pilot circuits in order to interdependently control the power factor of the voltages impressed by the several sub-stations, and, to this end, the distributing systems shown in Figs. 3 and 4 may be utilized.

Referring to Fig. 3, a sub-station $4^a$ is provided with a power transformer 8, the secondary winding $9^a$ of which furnishes power to the railway circuit, as hereinbefore described. The secondary windings of the regulators 10 and 11, however, are connected in circuit with the secondary winding $9^a$ and these regulators are so controlled that they respond to the conditions obtaining in the circuit comprising the secondary winding. In this instance, however, a sub-station $5^a$, which may be considered as being disposed at one of the ends of the railway system, contains the induction regulator 10 only, the operation of which is controlled by the voltage impressed by the secondary winding $9^a$ of the transformer 8 installed at the sub-station $5^a$. A pilot circuit, comprising leads 43, is connected across the secondary winding $9^a$ and parallels the entire railway system in order that each sub-station may be connected thereto, as will be hereinafter explained.

The power-factor meter 28 of the sub-station 4ᵃ is similar in all respects to the power-factor meter 28 of Fig. 1, but it is so connected in circuit that it indicates the phase displacement between the voltage impressed by the sub-station 4ᵃ and the voltage impressed by the sub-station 5ᵃ upon the railway system. This is accomplished by connecting the winding 29 to a secondary winding 44 of a voltage transformer 45, the primary of which is connected across the secondary winding 9ᵃ of the power transformer installed in the sub-station 4ᵃ. The movable coils 33 and 34 are connected across the pilot circuit comprising the conductors 43 that extend from the sub-station 5ᵃ. When the voltages impressed by the secondary windings 9ᵃ of the substations 4ᵃ and 5ᵃ are substantially in phase coincidence, the indicator 38 of the power-factor relay 28 will maintain its mid-position. When said voltages become displaced in phase relationship, the indicator 38 will engage either the conducting segment 40 or the conducting segment 41 depending upon whether the phase displacement between the voltages is positive or negative. As a consequence thereof, the voltage regulator 11 is operated in order to induce voltages in the secondary circuit of the sub-station 4ᵃ of proper value and proper phase relationship to establish phase coincidence between the voltages impressed by the sub-station 5ᵃ and the substation 4ᵃ.

It will be apparent that all of the sub-stations supplying power to the railway system are controlled in a manner similar to that described in connection with the sub-station 4ᵃ. In this respect, all the voltages impressed upon the trolley conductor 1 will be substantially in phase coincidence with one another. The voltage regulators 10 installed at each sub-station will operate simultaneously to maintain the value of the several voltages equal, irrespective of the power demands required from the several sub-stations due to the moving loads upon the railway circuit.

Referring to Fig. 4, three sub-stations 46, 48 and 49 are shown as supplying power to the railway system comprising the trolley conductor 1. The sub-station 49 may be considered as being disposed at one end of the distributing system, the sub-stations 46 and 48 being spaced at suitable intervals therefrom.

The sub-station 49 is equipped with the induction regulator 10 which responds so as to maintain the value of the voltage impressed by the sub-station 49 upon the railway circuit constant. Conductors 50, connected in shunt to the secondary winding 9ᵃ of the power transformer installed at the sub-station 49, extend to the sub-station 48 and are connected across the coils 33 and 34 of the power-factor meter 28 installed at the sub-station 48. The winding 29 of the power-factor relay 28 is connected to the secondary winding 44 of the voltage transformer 45, the primary being connected in shunt to the secondary 9ᵃ of the power transformer installed at the sub-station 48. Consequently, the operation of the power factor regulator 11 installed at the sub-station 48 responds to the phase relationship existing between the voltages impressed upon the railway system by the sub-stations 48 and 49.

Similarly, the sub-stations 46 and 48 are inter-connected in order to control the operation of the relay 28 installed at the sub-station 46. To accomplish this, conductors 51, connected across the secondary winding 9ᵃ of the power transformer at the sub-station 48, extend to the sub-station 46 and are connected to the power-factor relay, as explained in connection with the sub-station 48. In this manner, each successive sub-station is interconnected by means of a pilot circuit with the sub-station immediately preceding in order to maintain the voltages impressed by the several sub-stations in phase coincidence with one another. As hereinbefore explained, the values of the voltages impressed by the several sub-stations are maintained constant by means of independent voltage relays which are set to a common normal value.

I have shown induction regulators 10 and 11, but it is understood that other forms of regulating devices or other connections may be utilized for impressing the proper component voltages upon the sub-station transformers 8.

While I have shown and described one embodiment of my invention, it will be understood that many modifications may be made without departing from the spirit and scope of the appended claims.

I claim as my invention:

1. An electrical distributing system for alternating currents comprising a load circuit, a plurality of spaced power units for furnishing energy thereto, a translating device adapted to draw energy from variable points in said load circuit between said power unit connections thereto, means for maintaining the voltages impressed upon said load circuit by said power units constant, and additional means for maintaining the power factors of the currents supplied thereby constant irrespective of the positions of said load and the demands for power required thereby from the several power units.

2. An alternating-current railway system comprising a trolley circuit supplied with energy from a plurality of spaced sub-stations, and voltage controlling means for said sub-stations for maintaining the ampere-miles on each side of a moving load point on said trolley circuit equal, and additional means for simultaneously maintaining the currents flowing from the several sub-stations to said load point substantially directly opposed in phase relationship, said means being severally influenced by the conditions obtaining in said trolley circuit.

3. An alternating-current railway system comprising a trolley circuit, a plurality of spaced sub-stations for furnishing energy thereto, and voltage controlling means associated with each sub-station for maintaining the ampere-miles on each side of a moving load point on said trolley circuit equal, and additional means for simultaneously maintaining the currents flowing in opposite directions to said load point substantially directly opposed in phase relationship, both of said means comprising induction regulators severally influenced by the conditions existing in said trolley circuit.

4. An alternating-current railway system comprising a trolley circuit, a plurality of spaced sub-stations furnishing energy thereto, and means comprising induction regulators for maintaining the voltages impressed thereupon by said sub-stations constant and the power factors of the load currents supplied from said sub-stations constant irrespective of the position of said load between said sub-stations and the demands of power required thereby.

5. The combination with an alternating-current railway system comprising a trolley circuit and a plurality of spaced power units for furnishing energy thereto, of an intelligence-transmission circuit subject to the inductive effects arising from said trolley circuit, and regulating means associated with said power units and controlling the voltage and power factor of the energy supplied to said trolley circuit, whereby the electromotive forces induced in said intelligence-transmission circuit by reason of the currents flowing from the power units to an intermediate load point are substantially equal in value and substantially directly opposed in phase relationship to each other.

In testimony whereof, I have hereunto subscribed my name this 27th day of July, 1915.

CHARLES LE G. FORTESCUE.

Copies of this patent may be obtained for five cents each, by addressing the "Commissioner of Patents, Washington, D. C."